United States Patent
Wu et al.

(10) Patent No.: US 6,687,055 B2
(45) Date of Patent: Feb. 3, 2004

(54) METHOD OF TEMPERATURE COMPENSATION FOR INTERLEAVER

(75) Inventors: Li Wu, Fuxing Investment District (CN); Jiwu Ling, Fuxing Investment District (CN); Feng Liang, Shaughui (CN); Heping Zeing, Shaughui (CN)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/186,377

(22) Filed: Jul. 1, 2002

(65) Prior Publication Data

US 2003/0007247 A1 Jan. 9, 2003

(30) Foreign Application Priority Data

Jul. 2, 2001 (CN) .......................................... 01113750 A

(51) Int. Cl.$^7$ ............................. G02B 27/28; G02B 7/18
(52) U.S. Cl. .................. 359/498; 359/497; 359/499; 359/500; 359/900
(58) Field of Search ..................... 359/499, 496, 359/497, 498, 500, 501, 900

(56) References Cited

U.S. PATENT DOCUMENTS

| | | | | |
|---|---|---|---|---|
| 4,097,818 A | * | 6/1978 | Manoukian et al. | 372/19 |
| 4,103,260 A | * | 7/1978 | Buchman | 359/250 |
| 5,035,495 A | * | 7/1991 | Toyoda et al. | 359/512 |
| 5,537,209 A | * | 7/1996 | Lis | 356/487 |
| 6,075,512 A | * | 6/2000 | Patel et al. | 345/101 |
| 6,393,176 B1 | * | 5/2002 | Cao | 385/24 |
| 6,395,126 B1 | * | 5/2002 | Cullen et al. | 156/293 |
| 6,437,916 B1 | * | 8/2002 | McLeod et al. | 359/499 |
| 6,487,342 B1 | * | 11/2002 | Wu et al. | 385/39 |
| 2002/0097759 A1 | * | 7/2002 | Zhao | 372/18 |
| 2002/0191291 A1 | * | 12/2002 | Zhao | 359/499 |

FOREIGN PATENT DOCUMENTS

| | | | | |
|---|---|---|---|---|
| JP | 61-087138 A | * | 5/1986 | |
| JP | 05-027200 A | * | 2/1993 | |

* cited by examiner

*Primary Examiner*—John Juba
(74) *Attorney, Agent, or Firm*—Allen, Dyer, Doppelt, Milbrath & Gilchrist, P.A.

(57) ABSTRACT

The invention provides a simple temperature insensitive optical retarder (waveplate) having a first and a second wedge shaped birefringent crystals, and a crystal mount comprising a first material having a low thermal expansion coefficient and a second material having a high thermal expansion coefficient, wherein the first and the second wedge shaped birefringent crystals are attached onto the first and second materials, respectively, so that the total retardance by the first and second birefringent crystals at a first temperature is substantially the same as that at a second different temperature at a given wavelength. Advantageously, the temperature insensitive optical retarder is simple, easy to construct, can be used for any birefringent crystal and does not require the use of different birefringent crystals.

23 Claims, 3 Drawing Sheets

METHOD OF TEMPERATURE COMPENSATION FOR INTERLEAVER

CROSS REFERENCE TO RELATED APPLICATIONS

The present application claims priority to Chinese application having serial number 01113750.9 entitled "Novel method of temperature compensation for interleaver", filed on Jul. 2, 2001 which is incorporated herein by reference

FIELD OF THE INVENTION

The present invention relates generally to the configuration of optical retarders, and in particular to methods for configuring temperature insensitive optical retarders using birefringent crystals.

BACKGROUND OF THE INVENTION

Optical retarders (waveplates) is one of the most common optical elements with wide applications in solar system observation such as birefringent filters, display, and telecommunication systems. Especially, with the recent rapid progress in optical telecommunication systems, optical retarder has become one of the important devices for building advanced optical components. One of the applications of the optical retarders in the optical communication systems is in construction of optical interleavers.

As telecommunications usage increases as a result of, for example, increased Internet usage, increased types of communications, population growth, etc., telecommunications providers are required to provide greater voice- and data-carrying capacity. In order to reduce cost and the amount of time required to provide the increased capacity, wavelength division multiplexing (WDM) and dense wavelength division multiplexing (DWDM) have been developed, which provide increased capacity without requiring new fiber optic cables. WDM and DWDM technologies combines multiple optical signals into a single fiber by transporting each signal on a different optical wavelength or channel. Multiplexing and demultiplexing of optical channels is typically accomplished with thin film optical filters. However, multiple layers of film are required to multiplex and demultiplex multiple channels, which increases the cost and complexity of a component.

One solution is the use of interleaver technology, and in particular to the birefringent waveplate-based interleaver technology disclosed in U.S. Pat. No. 4,566,761 issued Jan. 28, 1986; and U.S. Pat. No. 4,685,773 issued Aug. 11, 1987 both to Carlsen et al. Optical interleavers multiplex and demultiplex a plurality of optical channels into odd and even channels with the spacing twice larger than that of the original channels.

One problem associated with the conventional birefringent waveplate (retarder) based interleaver is the temperature sensitivity due to the refractive index change of the birefringent crystal. To solve this problem, a temperature insensitive optical retarder (waveplate) that uses two different crystals with opposite temperature dependence of refractive indices is proposed. Although this solution works as intended, however, in practice, it is difficult to find an exact match between two birefringent crystals, and the compensation range is also limited due to nonlinearity of the refractive index change.

One of the objectives of the present invention is to provide a temperature insensitive optical retarder that is easy to construct and provides wide operating range.

Another objetive of the present invention is to provide a temperature insensitive interleaver.

SUMMARY OF THE INVENTION

In accordance with one aspect of the present invention, there is provided a temperature insensitive optical retarder using birefringent crystals comprising;

first and second wedge shaped birefringent crystals each having non parallel faces; and a holding means for mounting said first and second birefringent crystals comprising a first material having a first thermal expansion coefficient and a second material having a second thermal expansion coefficient which is different from the first thermal expansion coefficient;

wherein the first and the second wedge shaped birefringent crystals are attached onto the first and second materials, respectively, so that the total retardance by the first and second birefringent crystals at a first temperature is substantially the same as that at a second different temperature at a given wavelength.

In accordance with another aspect of the present invention, there is provided a method for configuring a temperature insensitive optical retarder comprising the steps of;

providing a first wedge shaped birefringent crystal;
providing a second wedge shaped birefringent crystal;
providing a mount including a first material having a first thermal expansion coefficient and a second material having a second material;
mounting the first birefringent crystal to the first material and the second birefringent crystal to the second material, so that they are movable relative to each other;

wherein the first and second materials are selected so that the total retardance by the first and second crystal is substantially the same at a given wavelength over a given temperature range.

In accordance with another aspect of the present invention, there is provided an optical interleaver/deinterleaver for multiplexing two data streams into a stream of channels or for demultiplexing a stream of channels into two sets of data streams comprising;

at least first and second wedge shaped birefringent crystals each having non parallel faces; and a holding means for mounting said first and second birefringent crystals comprising a first material having a first thermal expansion coefficient and a second material having a second thermal expansion coefficient which is different from the first thermal expansion coefficient;

wherein the first and the second wedge shaped birefringent crystals are attached onto the first and second materials, respectively, so that the total retardance by the first and second birefringent crystals at a first temperature is substantially the same as that at a second different temperature at a given wavelength.

Other aspects and features of the present invention will become apparent to those ordinarily skilled in the art upon review of the following description of specific embodiments of the invention ill conjunction with the accompanying figures.

BRIEF DESCRIPTION OF THE DRAWINGS

Further features and advantages of the present invention will be described in the detailed description, taken in combination with the appended drawings wherein like numerals represent like elements, and wherein.

DETAILED DESCRIPTION OF THE PRESENT INVENTION

Figure 1:
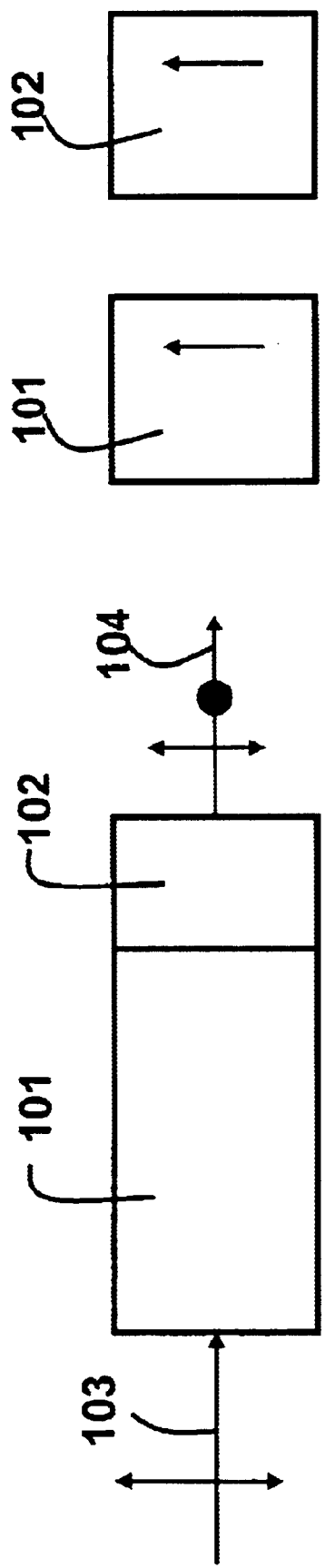
FIG. 1 shows a prior art temperature insensitive optical retarder.

Referring to FIG. 1, a prior art temperature insensitive optical retarder 100 includes an $YVO_4$ birefringent crystal 101, and a KTP birefringent crystal 102 is disclosed. The optical axes of $YVO_4$ and KTP crystals are parallel to each other and in the incident plane as indicated in FIG. 1, therefore, each of these crystals acts as a retarder (i.e., waveplate). At a given temperature, when a linearly polarized light 103 is launch into the crystals 101 and 102, a given polarization state of the output beam 104 is obtained depending on the total retardance provided by the crystals 101 and 102. Since the refractive indices of $YVO_4$ and KTP are temperature sensitive, therefore, when temperature changes, the retardance provided by $YVO_4$ or KTP crystal alone will change. However, since the temperature dependence of the refractive index of $YVO_4$ crystal has the opposite sign as that of KTP crystal, the optical path length difference in the $YVO_4$ crystal 101 can be compensated by that in KTP crystal 102 by properly selecting the length of $YVO_4$ and KTP crystals, resulting in a constant total retardance over a given temperature range thus a temperature insensitive optical retarder. Although the prior art method of using two different types of crystals works in theory as intended, however, in practice it is very difficult to find a match between two crystals at all conditions.

Figure 2:
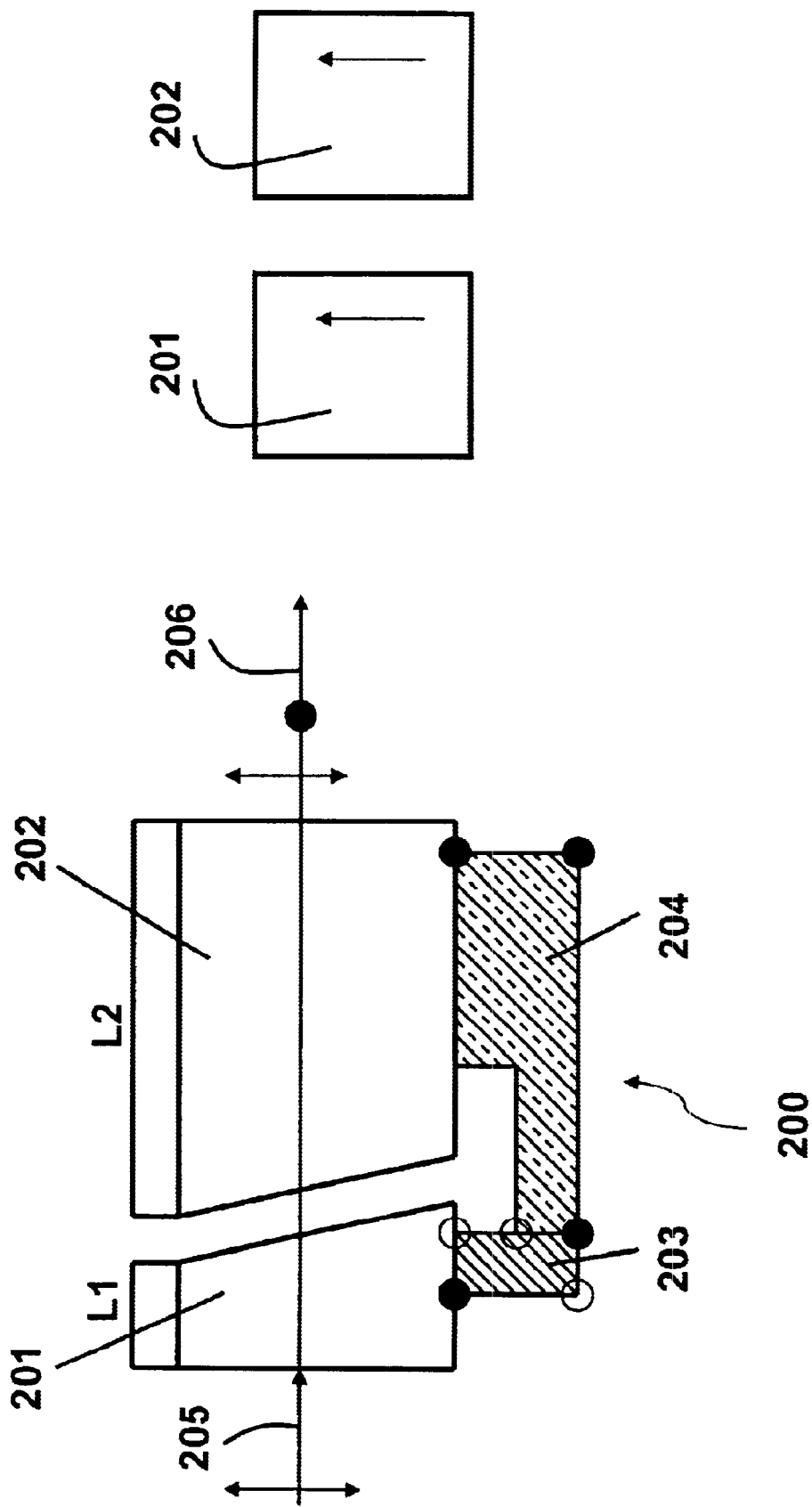
FIG. 2 shows a temperature insensitive optical retarder in accordance with an embodiment of the present invention.

FIG. 2 shows a temperature insensitive optical retarder for application in 100 GHz spaced interleavers in accordance with an embodiment of the present invention including two wedge shaped $YVO_4$ birefringent crystals 201 and 202. The total length ($L_1+L_2$) of the crystals 201 and 202 is 7.351 mm, resulting in a free spectral range (FSR) of 100 GHz. The crystal 201 and 202 can be from the same or different materials such as crystal quartz, calcite, $LiNbO_3$, rutile, KTP, or other birefringent materials as well. The optical axes of 201 and 202 crystals are parallel to each other and in the incident plane; therefore, each of these crystals acts as a retarder (i.e., waveplate). The crystals 201 and 202 are mounted onto hold 200 comprising a metal portion of 203 and a low thermal expansion glass portion of 204, such as ULE from Corning or Zerodur. The thermal expansion coefficient of 204 is in the range of $0.03 \times 10^{-6}$ to $0.5 \times 10^{-6}$ and is 2 to 4 orders of magnitude smaller than that of 203, and metal 203 is firmly attached to 204 using proper adhesives such as epoxy.

In the present invention, temperature dependent retardance change in the birefringent crystal is compensated by the temperature dependent dimensional change of the metal 203. With the increase of temperature, metal 203 expands and moves crystal 201 upwards, therefore, increases the effective optical path length in crystal 201 resulting in an increase of retardance and compensates the temperature induced reduction of retardance. Similarly, with the temperature decrease, metal 203 shrinks and moves crystal 201 downwards, therefore, reduces the effective optical path length in the crystal 201 resulting in a decrease of the retardance and compensates the temperature induced increase of retardance.

In this embodiment, since an air gap exists between the crystals 201 and 202, an additional optical path length difference exists. However, this difference is very small and can be adjusted by properly selecting the wedge angle and crystal length.

Figure 3:
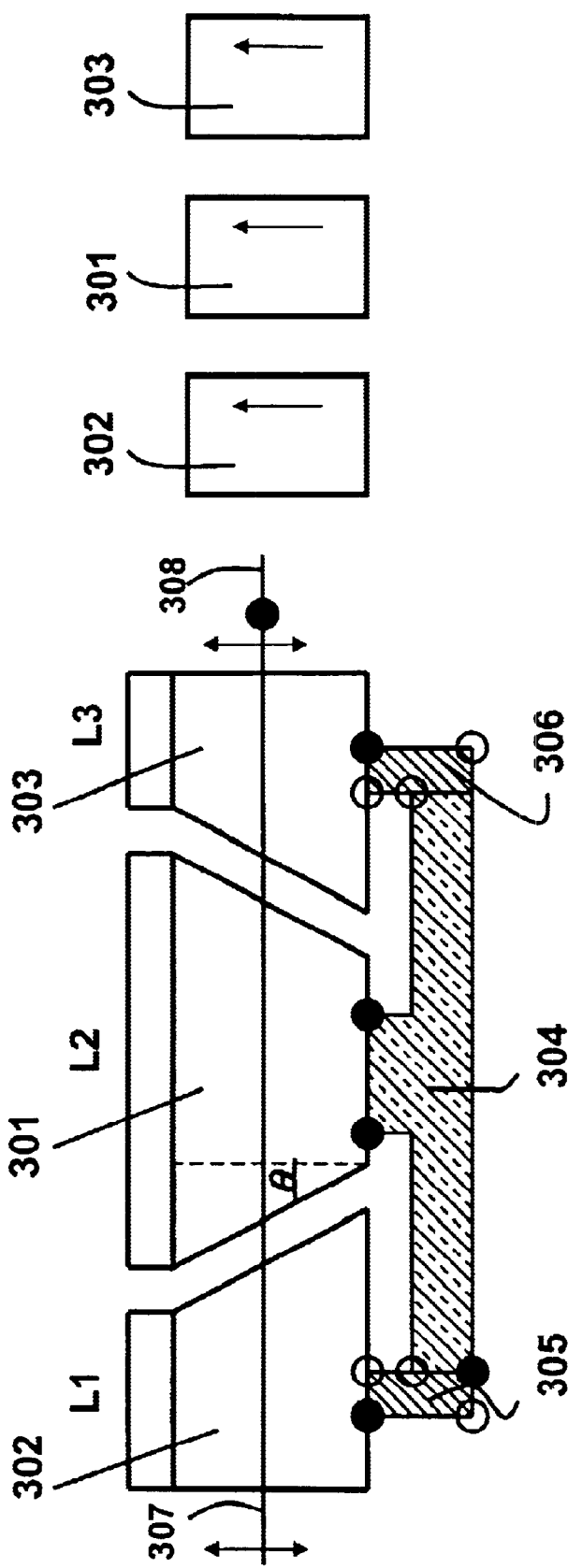
FIG. 3 shows a temperature insensitive optical retarder in accordance with another embodiment of the present invention including three birefringent crystals.

FIG. 3 shows a temperature insensitive optical retarder for application in 100 GHz spaced interleavers in accordance with another embodiment of the present invention including three wedge shaped $YVO_4$ birefringent crystals 301, 302 and 303 for eliminating the path length difference caused by the air gaps. The optical axes of crystals 301, 302 and 303 are parallel to each other and in the incident plane; therefore, each of these crystals acts as a retarder (i.e., waveplate). The crystal 301 is mounted onto a low thermal expansion glass 304, such as ULE from Corning or Zerodur. The thermal expansion coefficient of 304 is in the range of $0.03 \times 10^{-6}$ to $0.5 \times 10^{-6}$ and is 2 to 4 orders of magnitude smaller than that of metal 305 and 306, and metal 305 and 306 are firmly attached to 304 using proper adhesives such as epoxy. In this embodiment, temperature dependent retardance change in the birefringent crystal is compensated by the temperature dependent dimensional change of the metal 305 and 306.

In the present invention, the amount of compensation is determined by the thermal expansion coefficient and dimension of the mount and the wedge angle, therefore, can be very easily matched to any birefringent crystal. For example, for compensating the retarder for 100 GHz interleaver applications, if $YVO_4$ crystals with a wedge angle of 10 degree are used, and the thermal expansion coefficient of the mounts 305 and 306 is $39.5 \times 10^{-6}$, then the height of the mounts 305 and 306 would be 11.923 mm. Although metal is mentioned in the embodiments for high thermal expanson materials, but it is not limited to metals, other materials such as ceramic, plastic, etc. can also be used.

While the invention has been described and illustrated in connection with preferred embodiments it is to be understood that the subject matter herein is not to be limited to those specific embodiments. On the contrary, it is intended for the subject matter of the invention to include all alternatives, modifications and equivalents as can be included within the spirit and full scope of the following claims.

What is claimed is:

1. A temperature insensitive optical retarder comprising;
    at least a first and a second wedge shaped birefringent crystals each having non parallel faces; and
    a holding means for mounting said first and second birefringent crystals comprising a first material having a first thermal expansion coefficient and a second material having a second thermal expansion coefficient which is different from the first thermal expansion coefficient;
    wherein the first and the second wedge shaped birefringent crystals are attached onto the first and second materials, respectively, so that the total retardance by the first and second birefringent crystals at a first temperature is substantially the same as that at a second different temperature at a given wavelength.

2. The optical retarder of claim 1, wherein a gap exists between said first and second birefringent crystals, so that the first and the second birefringent crystal are movable relative to each other.

3. The optical retarder of claim 1, wherein the first birefringent crystal is mounted on the first material having low thermal expansion coefficient.

4. The optical retarder of claim 3, wherein the second birefringent crystal is mounted on the second material having a thermal expansion coefficient at least twice larger than that of the first thermal expansion coefficient.

5. The optical retarder of claim 1, wherein at least one of the first and second materials is metal.

6. The optical retarder of claim 1, wherein the temperature dependence of the retardance is compensated by the dimension change of at least one of the first and second materials.

7. The optical retarder of claim 1, wherein wedged faces of the first and second birefringent crystals face each other, and an input face of the first crystal is parallel to the output face of the second birefringent crystal.

8. The optical retarder of claim 1, further comprising a third birefringent crystal and a third material for mounting said third crystal.

9. The optical retarder of claim 8, wherein the third crystal is movable relatively to the first and second crystals.

10. A method for configuring a temperature insensitive optical retarder comprising the steps of;
   providing a first wedge shaped birefringent crystal;
   providing a second wedge shaped birefringent crystal;
   providing a mount including a first material having a first thermal expansion coefficient and a second material having a second material;
   mounting the first birefringent crystal to the first material and the second birefringent crystal to the second material, so that they are movable relative to each other;
   wherein the first and second materials are selected so that the total retardance by the first and second crystal is substantially the same at a given wavelength over a given temperature range.

11. The method of claim 10, wherein the first material has a low thermal expansion coefficient.

12. The method of claim 11, wherein the second material has a thermal expansion coefficient at least twice larger than that of the first thermal expansion coefficient.

13. The method of claim 10, wherein at least one of the first and second materials is metal.

14. The method of claim 10, wherein the temperature dependence of the retardance is compensated by the dimension change of at least one of the first and second materials.

15. An optical interleaver/deinterleaver for multiplexing two data streams into a stream of channels or for demultiplexing a stream of channels into two sets of data streams comprising;

a. at least a first and a second wedge shaped birefringent crystals each having non parallel faces; and
   b. a holding means for mounting said first and second birefringent crystals comprising a first material having a first thermal expansion coefficient and a second material having a second thermal expansion coefficient which is different from the first thermal expansion coefficient;
   wherein the first and the second wedge shaped birefringent crystals are attached onto the first and second materials, respectively, so that the total retardance by the first and second birefringent crystals at a first temperature is substantially the same as that at a second different temperature at a given wavelength.

16. The optical interleaver/deinterleaver of claim 15, wherein a gap exists between said first and second birefringent crystals, so that the first and the second birefringent crystal are movable relative to each other.

17. The optical interleaver/deinterleaver of claim 15, wherein the first birefringent crystal is mounted on the first material having low thermal expansion coefficient.

18. The optical interleaver/deinterleaver of claim 17, wherein the second birefringent crystal is mounted on the second material having a thermal expansion coefficient at least twice larger than that of the first thermal expansion coefficient.

19. The optical interleaver/deinterleaver of claim 15, wherein at least one of the first and second materials is metal.

20. The optical interleaver/deinterleaver of claim 15, wherein the temperature dependence of the retardance is compensated by the dimension change of at least one of the first and second materials.

21. The optical interleaver/deinterleaver of claim 15, wherein wedged faces of the first and second birefringent crystals face each other, and an input face of the first crystal is parallel to the output face of the second birefringent crystal.

22. The optical interleaver/deinterleaver of claim 15, further comprising a third birefringent crystal and a third material for mounting said third crystal.

23. The optical interleaver/deinterleaver of claim 22, wherein the third crystal is movable relatively to the first and second crystals.

* * * * *

UNITED STATES PATENT AND TRADEMARK OFFICE
CERTIFICATE OF CORRECTION

PATENT NO. : 6,687,055 B2
DATED : February 3, 2004
INVENTOR(S) : Wu et al.

It is certified that error appears in the above-identified patent and that said Letters Patent is hereby corrected as shown below:

<u>Title page,</u>
Item [75], Inventor, name "Heping Zeing" should read -- Heping Zeng --

Signed and Sealed this

Sixth Day of July, 2004

JON W. DUDAS
*Acting Director of the United States Patent and Trademark Office*